(12) United States Patent
Kim

(10) Patent No.: US 9,794,197 B2
(45) Date of Patent: Oct. 17, 2017

(54) METHOD AND APPARATUS FOR TRANSMITTING CAN FRAME

(71) Applicant: HYUNDAI AUTRON CO., LTD., Seongnam-si (KR)

(72) Inventor: Kyung-Tae Kim, Anyang-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 0 days.

(21) Appl. No.: 14/961,105

(22) Filed: Dec. 7, 2015

(65) Prior Publication Data

US 2016/0173418 A1  Jun. 16, 2016

(30) Foreign Application Priority Data

Dec. 10, 2014 (KR) .................. 10-2014-0177858

(51) Int. Cl.
*H04L 12/883* (2013.01)
(52) U.S. Cl.
CPC .................. *H04L 49/9021* (2013.01)
(58) Field of Classification Search
CPC ......... H04L 12/5693; H04L 2012/5681; H04L 47/50; H04L 49/90; H04L 49/3018; H04L 49/3027; H04L 47/52; H04L 67/1097
See application file for complete search history.

(56) References Cited

U.S. PATENT DOCUMENTS

| 5,819,290 A | 10/1998 | Fujita | |
| 6,721,799 B1* | 4/2004 | Slivkoff | G06F 15/78 700/101 |
| 8,265,091 B2* | 9/2012 | Firoiu | H04L 12/5693 370/232 |
| 2004/0095998 A1* | 5/2004 | Luo | H04N 19/53 375/240.16 |
| 2004/0170195 A1 | 9/2004 | Slivkoff et al. | |
| 2005/0114337 A1* | 5/2005 | Lunteren | H04L 45/00 |

(Continued)

FOREIGN PATENT DOCUMENTS

| DE | 10 2010 001 596 A1 | 8/2011 |
| JP | 11-187052 A | 7/1997 |

(Continued)

OTHER PUBLICATIONS

Korean Intellectual Property Office, Office Action for Korean patent application No. 10-2014-0177858, Jan. 14, 2016, Korea.

(Continued)

*Primary Examiner* — Mohamed Kamara
(74) *Attorney, Agent, or Firm* — Hyunho Park

(57) ABSTRACT

The present invention relates to a method and apparatus for transmitting a CAN frame. A method for transmitting a CAN frame includes receiving an input of a transmission file containing a plurality of CAN frames; detecting the number of the CAN frames contained in the transmission file; comparing the number of the CAN frames with the number of transmission buffers; mapping, when the number of the CAN frames is less than or equal to the number of the transmission buffers, the CAN frames onto the transmission buffers in a one-to-one mapping manner; and mapping, when the number of the CAN frames is greater than the number of the transmission buffers, the CAN frames onto the transmission buffers in a many-to-one mapping manner.

8 Claims, 4 Drawing Sheets

(56) References Cited

U.S. PATENT DOCUMENTS

| | | | | |
|---|---|---|---|---|
| 2005/0220115 A1* | 10/2005 | Romano | ................ | H04L 49/90 |
| | | | | 370/395.4 |
| 2009/0046776 A1* | 2/2009 | Au | ........................ | H04N 19/19 |
| | | | | 375/240.01 |
| 2010/0220735 A1 | 9/2010 | Vermunt et al. | | |
| 2013/0254462 A1* | 9/2013 | Whyte | ................ | H04L 67/1097 |
| | | | | 711/103 |

FOREIGN PATENT DOCUMENTS

| | | |
|---|---|---|
| JP | 2002-044005 A | 2/2002 |
| JP | 2011-165185 A | 8/2011 |
| JP | 2012-199816 A | 10/2012 |
| KR | 10-2011-0064561 A | 6/2011 |

OTHER PUBLICATIONS

German Patent Office, Office Action for German patent application No. 10 2015 121 088.6, Jan. 10, 2017, Germany.

* cited by examiner

METHOD AND APPARATUS FOR TRANSMITTING CAN FRAME

CROSS REFERENCE TO RELATED APPLICATION

This application claims the benefit of Korean Patent Application No. 10-2014-0177858, filed on Dec. 10, 2014, entitled "METHOD AND APPARATUS FOR TRANSMITTING CAN FRAME", which is hereby incorporated by reference in its entirety into this application.

BACKGROUND

1. Technical Field

The present invention relates to a method and apparatus for transmitting a CAN frame.

2. Description of the Related Art

Recently, with rapid increase of percentage of electronic devices in vehicles, the amount of data transferred between electric control units (ECUs) has increased. Data communication has switched from point-to-point communication to in-vehicle network (IVN) communication, and a control area network (CAN) has recently become the most widely employed network. Currently, research is being widely conducted to apply FlexRay which is a future network. The CSMA/CD—based FlexRay, which has been developed to make up for the CAN which operates in the CSMA/CD scheme and is characterized by a low transfer rate and nondeterministic transmission delay, has a problem such as complexity of scheduling in designing a network.

Under the FlexRay protocol, messages to be transmitted are allocated to respective static slots, and only an ECU that is originally assigned is exclusively used until the network is terminated. Accordingly, if a message is added to or deleted from the network, the number of static slots needs to be modified, but modifying the number of static slots affects the base cycle of the FlexRay protocol and finally affects performance of the network.

Meanwhile, a platform based on automotive open system architecture (AUTOSAR), which is an international software standard for vehicles, includes basic software (BSW) modules divided according to functions thereof. Among the modules, the CAN Driver and CanIf module are responsible for CAN communication. Each BSW module consists of a static code, which is invariable, and a generated code, which is changed according to user settings. For the generated code, the user settings are stored in a medium of XML format, and a new code is created based on the information recorded in the medium.

To implement AUTOSAR platform-based CAN communication, network design information should be reflected on the CAN Driver and the CanIf module which are associated with CAN communication. However, it is very complex and difficult to manually reflect, on the AUTOSAR platform-based CAN communication modules, the network design information that is based on FIeld Bus EXchange (FIBEX), which is a XML-based standardized file format used under the FlexRay protocol. In addition, the FIBEX-based network design information does not reflect a hardware environment, and therefore the information requires a relevant mediation operation.

SUMMARY

It is an object of the present invention to provide a CAN frame transmission method and apparatus which may automatically map CAN frames onto transmission buffers included in a controller for vehicles in order to automatically reflect FIBEX-based network design information on AUTOSAR CAN communication modules.

It should be noted that objects of the present invention are not limited to the aforementioned object, and other objects of the present invention will be apparent to those skilled in the art from the following descriptions. The objectives and advantages of the invention may be realized and attained by elements recited in the claims and a combination thereof.

In accordance with one aspect of the present invention, a method for transmitting a controller area network (CAN) frame includes receiving an input of a transmission file containing a plurality of CAN frames; detecting the number of the CAN frames contained in the transmission file; comparing the number of the CAN frames with the number of transmission buffers; mapping, when the number of the CAN frames is less than or equal to the number of the transmission buffers, the CAN frames onto the transmission buffers in a one-to-one mapping manner; and mapping, when the number of the CAN frames is greater than the number of the transmission buffers, the CAN frames onto the transmission buffers in a many-to-one mapping manner.

In accordance with another aspect of the present invention, an apparatus for transmitting a controller area network (CAN) frame includes an input unit configured to receive an input of a transmission file containing a plurality of controller area network (CAN) frames; and a control unit configured to: detect the number of the CAN frames contained in the transmission file; compare the number of the CAN frames with the number of transmission buffers; map, when the number of the CAN frames is less than or equal to the number of the transmission buffers, the CAN frames onto the transmission buffers in a one-to-one mapping manner; and map, when the number of the CAN frames is greater than the number of the transmission buffers, the CAN frames onto the transmission buffers in a many-to-one mapping manner.

According to the present invention described above, CAN frames may be automatically mapped onto transmission buffers included in a controller for vehicles in order to automatically reflect FIBEX-based network design information on AUTOSAR CAN communication modules.

DETAILED DESCRIPTION

Aforementioned advantages, objects, and features of the invention will be set forth in detail with reference to the accompanying drawings such that those skilled in the art can easily practice the present invention. In describing the present invention, a detailed description of well-known technologies will be omitted if it is determined that such description can unnecessarily obscure the main points of the present invention. Hereinafter, embodiments of the present invention will be described in detail with reference to the accompanying drawings. Wherever possible, the same reference numbers will be used throughout the drawings to refer to the same or like parts. It should be understood that the present invention is not limited to the following embodiments, and that the embodiments are provided for illustrative purposes only. The scope of the invention should be defined only by the accompanying claims and equivalents thereof.

Figure 1:
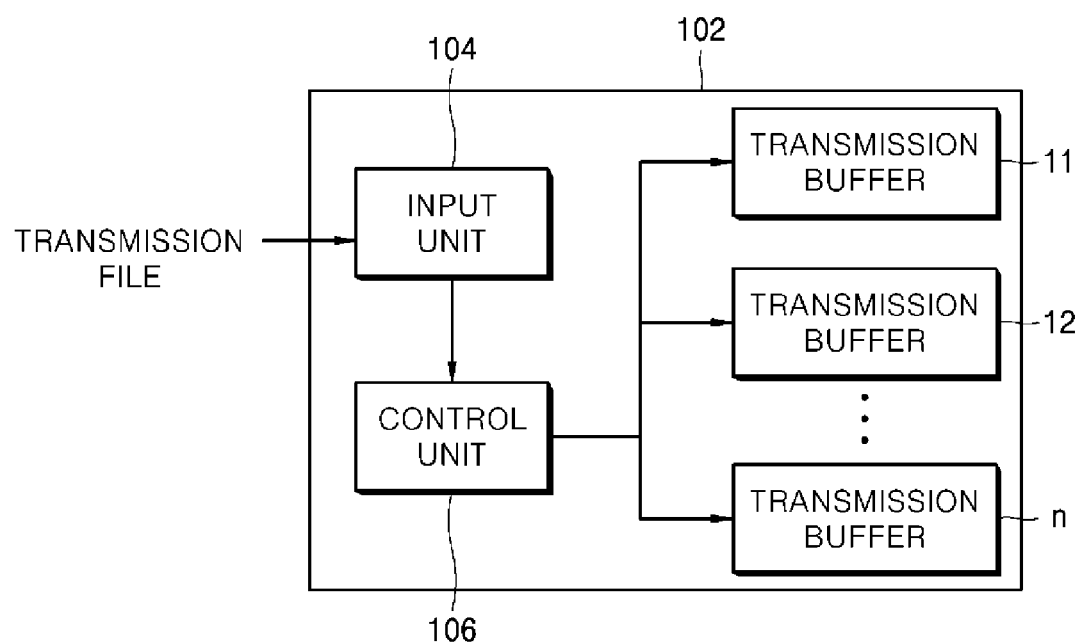
FIG. 1 is a block diagram illustrating a CAN frame transmission apparatus according to an embodiment of the present invention.

FIG. 1 is a block diagram illustrating a CAN frame transmission apparatus according to an embodiment of the present invention.

Referring to FIG. 1, a CAN frame transmission apparatus 102 according to an embodiment includes an input unit 104 and a control unit 106. The CAN frame transmission apparatus 102 may further include multiple transmission buffers 11, 12, . . . , and n for transmitting CAN frames.

The input unit 104 receives an input of a transmission file from an external source. In this embodiment, the transmission file may include multiple CAN frames. The transmission file may be an XML file based on a specific file format, for example, FIBEX. The FIBEX-based transmission file includes multiple CAN frames or CAN messages to be transmitted to other controllers. Herein, each CAN frame has an 11-bit ID and data having a size between 1 byte and 8 bytes.

The control unit 106 maps the multiple CAN frames included in the transmission file input through the input unit 104 onto the multiple transmission buffers 11, 12, . . . , and n. Destinations (e.g. other controllers) to which the CAN frames will be transmitted are set in the respective transmission buffers 11, 12, . . . , and n. Accordingly, once the control unit 106 maps the multiple CAN frames onto the multiple transmission buffers 11, 12, . . . , and n, the mapped CAN frames may be transmitted to the destinations set in the corresponding buffers. Herein, if the number of CAN frames included in the transmission file is less than or equal to the number of the transmission buffers 11, 12, . . . , and n, the CAN frames may be mapped onto the transmission buffers 11, 12, . . . , and n in a one-to-one mapping manner. On the other hand, if the number of the CAN frames is greater than the number of the transmission buffers 11, 12, . . . , and n, a separate mapping operation is needed.

According to an embodiment, the control unit 106 may detect the number of CAN frames included in the transmission file input through the input unit 104, and compare the number of the CAN frames with the number of transmission buffers. If the number of the CAN frames is less than or equal to the number of the transmission buffers as a result of comparison, the control unit 106 may map the CAN frames onto the transmission buffers in a one-to-one mapping manner. If the number of the CAN frames is greater than the number of the transmission buffers, the control unit 106 may map the CAN frames onto the transmission buffers in a many-to-one mapping manner.

According to an embodiment, the control unit 106 may set a full search range, search a CAN frame having an ID included in a preset unit search range within the full search range, and map the CAN frame included in the unit search range onto one transmission buffer. Herein, the unit search range may be defined by a maximum ID value and a minimum ID value.

In addition, after many-to-one mapping in the full search range is terminated, the control unit 106 may check whether there is a remaining CAN frame which has not been mapped onto a transmission buffer. If the number of the remaining CAN frames exceeds the number of the transmission buffers, the control unit 106 may increase the size of the unit search range.

Figure 2:
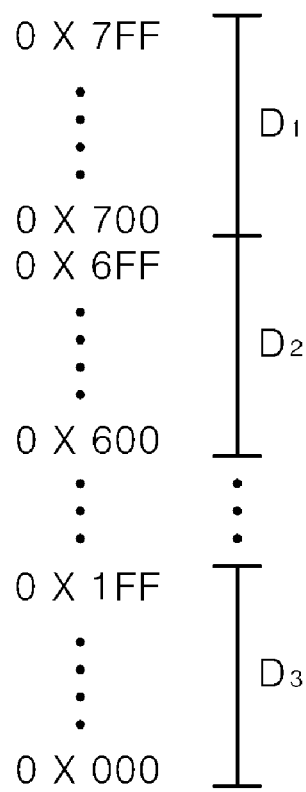
FIGS. 2 and 3 illustrate unit search ranges that are set using a method for transmitting a CAN frame according to an embodiment of the present invention.
Figure 3:
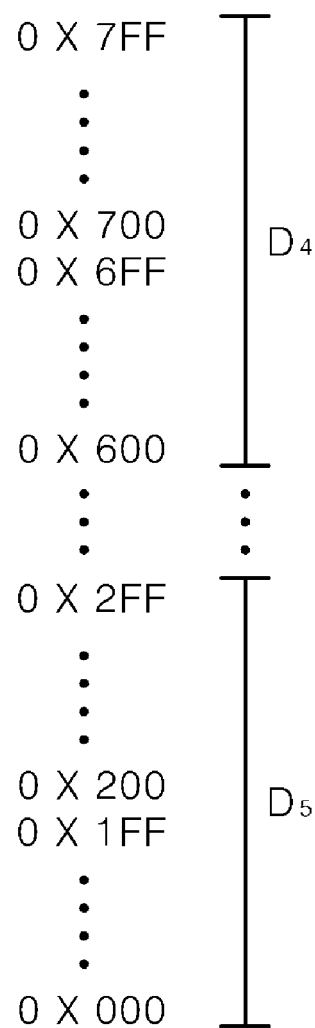

Hereinafter, a detailed description will be given of a method for transmitting a CAN frame according to an embodiment, with reference to FIGS. 2 to 4.

Figure 4:
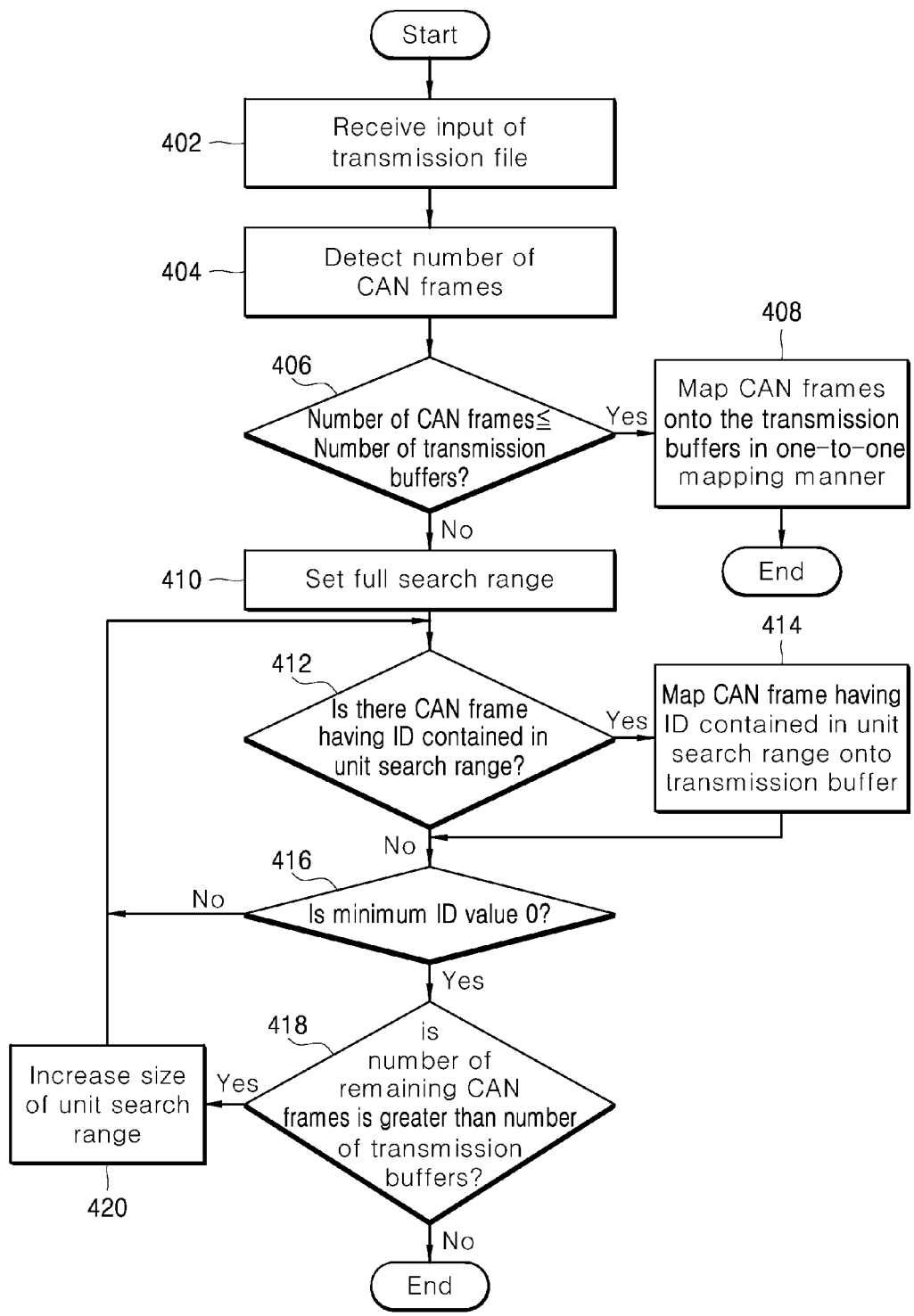
FIG. 4 is a flowchart illustrating a method for transmitting a CAN frame according to an embodiment of the present invention.

Referring to FIG. 4, the input unit 104 receives a transmission file input from an external source (402). In this embodiment, the transmission file may include multiple CAN frames and may be an XML file based on a specific file format, for example, FIBEX. The FIBEX-based transmission file includes multiple CAN frames or CAN messages to be transmitted to other controllers. Herein, each CAN frame has an 11-bit ID and data having a size between 1 byte and 8 bytes.

Next, the control unit 106 detects the number of CAN frames included in the transmission file input through the input unit 104 (404). The control unit 106 compares the number of CAN frames included in the transmission file with the number of transmission buffers 11, 12, . . . , and n (406). If the number of CAN frames included in the transmission file is less than or equal to the number of the transmission buffers 11, 12, . . . , and n, the control unit 106 may map the CAN frames onto the transmission buffers 11, 12, . . . , and n in a one-to-one mapping manner (408).

If the number of the CAN frames included in the transmission file is greater than the number of the transmission buffers 11, 12, . . . , and n as a result of comparison in step 406, the control unit 106 sets a full search range. Herein, the full search range is a search range set to search IDs included in the respective CAN frames. For example, the control unit 106 may set the full search range to be between 0x7FF and 0x000 as shown in FIG. 2 or 3.

In addition, the control unit 106 may set unit search ranges having a predetermined size within the full search range. In FIG. 2, unit search ranges are indicated by D1, D2 and D3. In FIG. 3, unit search ranges are indicated by D4 and D5. Each unit search range may be defined by a maximum ID value and a minimum ID value. For example, for the unit search range D1, the maximum ID value is 0x7FF and the minimum ID value is 0x700.

The control unit 106 performs the search operation in the respective units search ranges within the set full search range and determines whether there are CAN frames having the IDs included in the unit search ranges among the CAN frames included in the transmission file (412).

If there is a CAN frame having an ID included in a unit search range as a result of determination in step 412, the control unit 106 maps the corresponding CAN frame onto a transmission buffer. The control unit 106 may map CAN frames having an ID included in a unit search range onto one transmission buffer.

Thereafter, the control unit 106 determines whether the minimum ID value of the unit search range is 0 (416). If the minimum ID value is 0, this means that search in the full search range has been completed. In this case, the control unit 106 detects the number of remaining CAN frames which have not been mapped onto transmission buffers among the CAN frames included in the transmission file, and determines whether the number of the remaining CAN frames is greater than the number of the transmission buffers (418). If the number of the remaining CAN frames is greater than the number of the transmission buffers, the control unit 106 increases the size of the unit search range (420), and then returns to step 412 to perform the search and mapping operations (steps 412 to 418) again. For example, if the number of the remaining CAN frames is greater than the number of the transmission buffers, the control unit 106 having set unit search ranges D1, D2 and D3 as shown in FIG. 2 may double the size of the unit search ranges D4 and D5 as shown in FIG. 3 and perform the search and mapping operations (steps 412 to 418) again.

If the minimum ID value of the unit search range is not 0 in step 416, this means that search in the full search range has not been completed. In this case, the control unit 106 returns to step 412 and perform the search and mapping operations (steps 412 to 418) again.

As such, mapping of CAN frames onto the transmission buffers 11, 12, . . . , and n may be automatically performed through the process described above even if the number of CAN frames included in a transmission file is greater than the number of the transmission buffers 11, 12, . . . , and n.

Those skilled in the art will appreciate that various substitutions, modifications, variations can be made to the present invention without departing from the technical spirit of the invention and that the present invention is not limited to the embodiments described above and the accompanying drawings.

What is claimed is:

1. A method for transmitting a controller area network (CAN) frame, the method comprising:
   receiving an input of a transmission file containing a plurality of CAN frames;
   detecting the number of the CAN frames contained in the transmission file;
   comparing the number of the CAN frames with the number of transmission buffers;
   mapping, when the number of the CAN frames is less than or equal to the number of the transmission buffers, the CAN frames onto the transmission buffers in a one-to-one mapping manner; and
   mapping, when the number of the CAN frames is greater than the number of the transmission buffers, the CAN frames onto the transmission buffers in a many-to-one mapping manner,
   wherein the mapping in the many-to-one mapping manner comprises:
   setting a full search range;
   searching a CAN frame having an ID contained in a preset unit search range within the full search range; and
   mapping the CAN frame contained in the unit search range onto one transmission buffer.

2. The method according to claim 1, wherein the mapping in the many-to-one mapping manner further comprises:
   checking, after the mapping in the many-to-one mapping manner in the full search range is completed, if there is remaining CAN frames not having been mapped onto the transmission buffers; and
   increasing the size of the unit search range when the number of the remaining CAN frames is greater than the number of the transmission buffers.

3. The method according to claim 1, wherein the unit search range is defined by a maximum ID value and a minimum ID value.

4. The method according to claim 1, wherein the transmission file is in a FIeld Bus EXchange (FIBEX)-based XML file format.

5. An apparatus for transmitting a controller area network (CAN) frame, the apparatus comprising:
   an input unit configured to receive an input of a transmission file containing a plurality of controller area network (CAN) frames; and
   a control unit configured to:
   detect the number of the CAN frames contained in the transmission file;
   compare the number of the CAN frames with the number of transmission buffers;
   map, when the number of the CAN frames is less than or equal to the number of the transmission buffers, the CAN frames onto the transmission buffers in a one-to-one mapping manner; and
   map, when the number of the CAN frames is greater than the number of the transmission buffers, the CAN frames onto the transmission buffers in a many-to-one mapping manner,
   wherein the control unit sets a full search range, searches a CAN frame having an ID contained in a preset unit search range within the full search range, and maps the CAN frame contained in the unit search range onto one transmission buffer.

6. The apparatus according to claim 5, wherein the control unit checks, after the mapping in the many-to-one mapping manner in the full search range is completed, if there is remaining CAN frames not having been mapped onto the transmission buffers, and increases the size of the unit search range when the number of the remaining CAN frames is greater than the number of the transmission buffers.

7. The apparatus according to claim 5, wherein the unit search range is defined by a maximum ID value and a minimum ID value.

8. The apparatus according to claim 5, wherein the transmission file is in a FIeld Bus EXchange (FIBEX)-based XML file format.

* * * * *